United States Patent [19]

Marks

[11] Patent Number: 4,471,509
[45] Date of Patent: Sep. 18, 1984

[54] COMBINATION NECKLACE AND EYEGLASS STRAP

[76] Inventor: Suzanne L. Marks, 10231 White Elm Rd., Dallas, Tex. 75243

[21] Appl. No.: 404,824

[22] Filed: Aug. 3, 1982

Related U.S. Application Data

[63] Continuation-in-part of Ser. No. 278,841, Jun. 29, 1981, abandoned.

[51] Int. Cl.³ ............................................. A44B 21/00
[52] U.S. Cl. .................................... 24/3 C; 24/115 H; 24/299; 24/343; 351/156
[58] Field of Search ............. 24/3 B, 3 C, 9, 3 M, 24/300, 3 J, 336, 3 G, 136 R, 495, 115 G, 115 H, 18, 115 R, 115 K, 298-302, 343, 481, 482; 351/156, 157, 123; 43/42.53

[56] References Cited

U.S. PATENT DOCUMENTS

| | | | |
|---|---|---|---|
| 1,879,991 | 9/1932 | Pratt | 24/300 X |
| 2,023,523 | 12/1935 | Grimball | 351/156 X |
| 2,204,947 | 6/1940 | Apfelbaum | 24/115 H |
| 2,296,084 | 9/1942 | Bloom et al. | 24/3 M |
| 2,645,832 | 7/1953 | Lee | 24/115.6 X |
| 2,835,945 | 5/1958 | Hilsinger | 24/300 X |
| 2,846,688 | 8/1958 | Meeker | 24/495 X |
| 3,397,026 | 8/1968 | Spina | . |
| 3,588,960 | 6/1971 | McClellan et al. | . |
| 3,766,610 | 10/1973 | Thorsbakken | 24/136 R X |
| 3,874,776 | 4/1975 | Seron | 351/156 X |
| 3,879,804 | 4/1975 | Lawrence | . |
| 3,979,795 | 9/1976 | Seron | 24/336 X |

*Primary Examiner*—William E. Lyddane
*Assistant Examiner*—James R. Brittain

[57] ABSTRACT

An item of jewelry (10) is described which may be used as a necklace or an eyeglass strap for maintaining eyeglasses about the neck of the wearer. A necklace section (12) is adapted to form a necklace by connecting the rings (20, 22) at its ends together. The ends (14, 16) may be used in combination with the necklace section (12) to form a strap for eyeglasses. The ends include rings (46) for engagement with the rings (20, 22) on the necklace section (12). The ends further include either a resilient strap (34) or an O-ring (54) which may be positioned over the earpiece of the eyeglasses. Ends (60) can be provided which include resilient strap material (62) forming a loop (80) which is adjustable.

9 Claims, 10 Drawing Figures

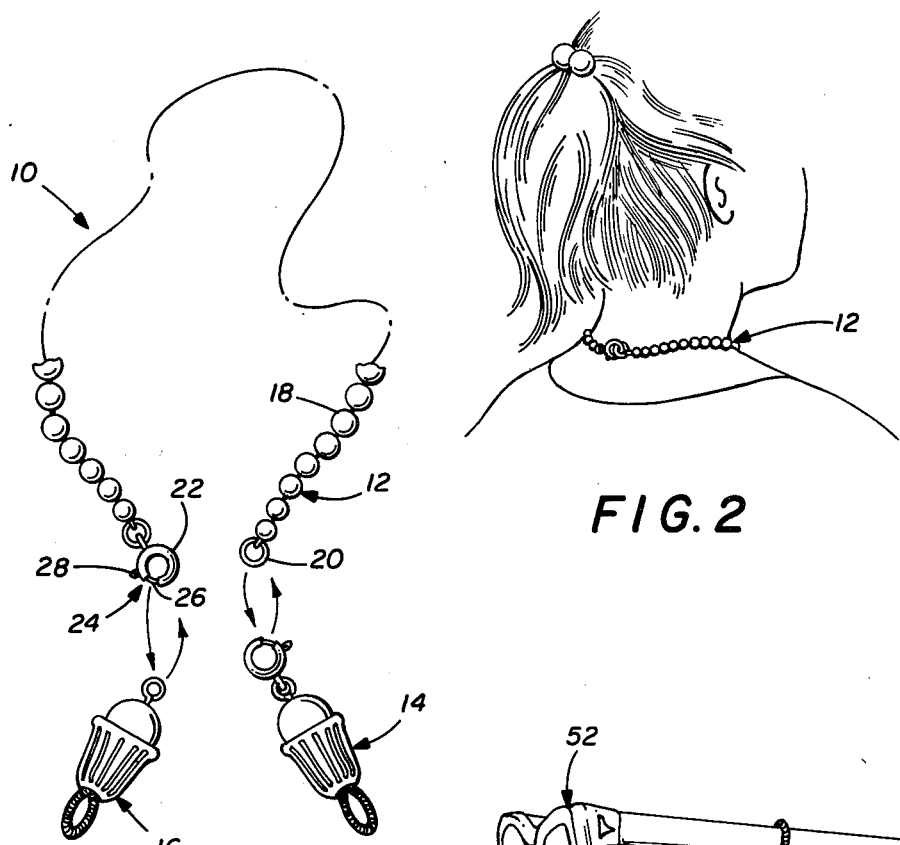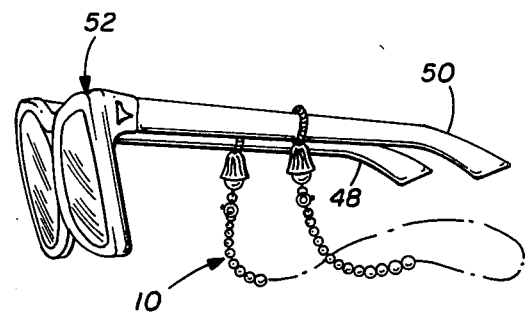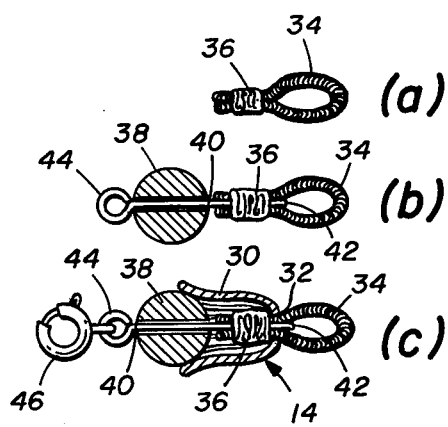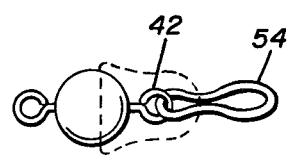

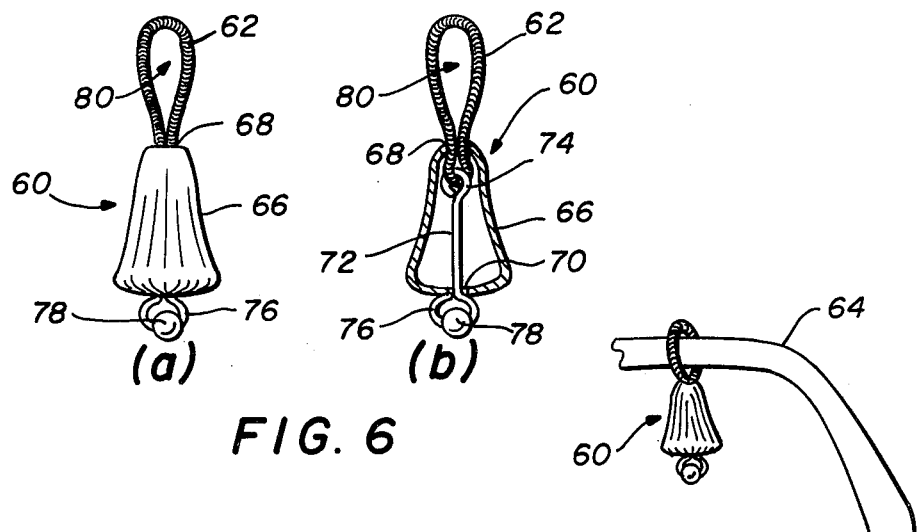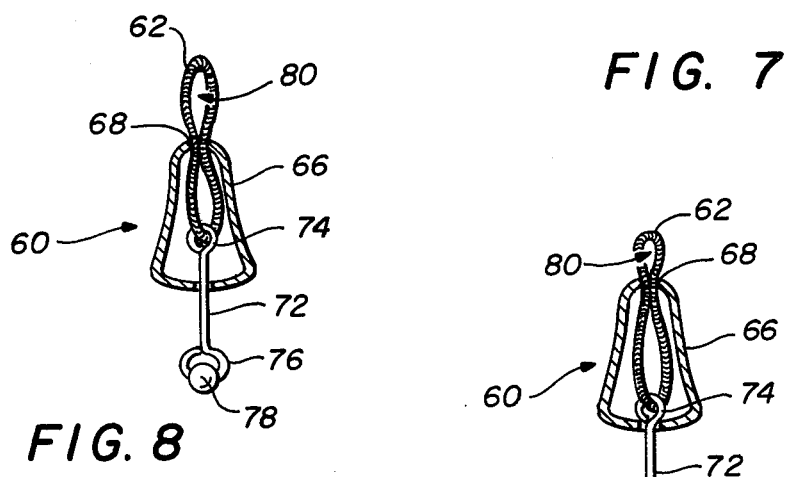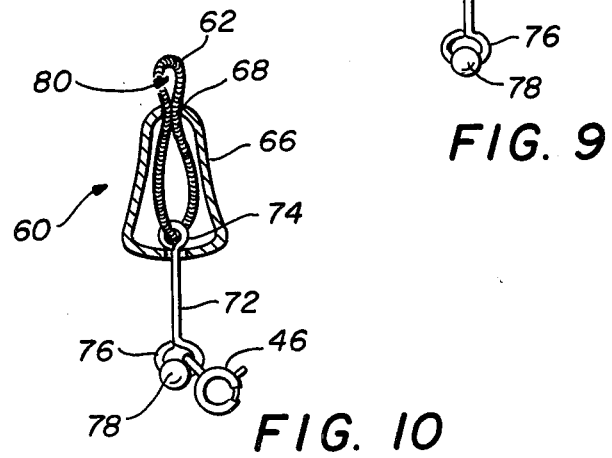

COMBINATION NECKLACE AND EYEGLASS STRAP

This application is a continuation-in-part of U.S. patent application Ser. No. 278,841, filed June 29, 1981, and now abandoned.

TECHNICAL FIELD

This invention relates to fashion wear, and in particular to jewelry for wear about the neck.

BACKGROUND ART

Necklaces have been worn for decorative purposes for many years. The necklace typically is formed into a single continuous strand which may be fastened at its end about the neck of the wearer by a clasp. This clasp commonly takes the form of a spring clip at one end for engaging a circle clip at the opposite end.

It is also common for persons employing eyeglasses to secure a flexible strap between the earpieces of the eyeglasses. One particular use of such a strap arises when the glasses are used only for reading or close work. It becomes inconvenient for the wearer to remove and replace the glasses from a case or pocket and the strap is used to suspend the glasses about the neck for immediate use. In the past, straps of this type have been constructed of relatively inexpensive materials and have a limited service life.

DISCLOSURE OF THE INVENTION

In accordance with one aspect of the present invention, an item of jewelry is provided. The jewelry includes a flexible strand having a first strand fastening structure at one end thereof and a second strand fastening structure at the opposite end thereof. The first and second strand fastening structures are adapted for mutual engagement to form a necklace. First and second ends are provided, each having loop structure for securing an end on the earpiece of a pair of eyeglasses. The first and second ends further have first and second fastening structures, respectively, adapted for a mutual engagement with the first and second strand fastening structures, respectively, to form an eyeglass strap to secure a pair of eyeglasses about the neck of a wearer.

In accordance with another aspect of the present invention, each end for use in the item of jewelry includes a body forming a generally cylindrical shape open at one end and having a closure at the opposite end with an aperture therethrough. A resilient O-ring is provided having a portion thereof extending into the body through the aperture. A ball for press fitting within the open end of the body is provided. The end fastening structure extends from one side of the ball and a loop extends from the opposite side for looping about the portion of the O-ring within the body to retain the portion in the body, the remainder of the O-ring extending out of the body forming the loop structure for securing the end to an earpiece of a pair of eyeglasses.

In accordance with another aspect of the present invention, ends are provided for an item of jewelry which include a body forming a generally cylindrical shape open at one end and having a closure at the opposite end with an aperture therethrough. A resilient strap material is provided forming a loop with the ends thereof extending through the aperture into the body. A crimp is provided for crimping the ends of the strap material. A ball is provided for press fitting within the open end of the body. An end fastening structure extends from one end of the ball and a loop extends from the opposite end for securing the crimp and strap material thereto.

In accordance with yet another aspect of the present invention, an end is provided which includes a loop for sliding the end onto the earpiece of a pair of glasses with the loop being adjustable to secure the end on the earpiece.

BRIEF DESCRIPTION OF THE DRAWINGS

A more complete understanding of the invention may be had by reference to the following Detailed Description taken in conjunction with the accompanying Drawings, wherein:

FIG. 1 is a perspective view of an item of jewelry forming one embodiment of the present invention;

FIG. 2 illustrates the jewelry used as a necklace;

FIG. 3 illustrates the use of the jewelry as an eyeglass strap;

FIG. 4 illustrates a first construction of the ends used in the jewelry;

FIG. 5 illustrates an alternate construction of the ends of the jewelry;

FIGS. 6a and b illustrate a first modification of an end used in the jewelry which permits adjustment in the length of the strap material;

FIG. 7 illustrates the modified end with the strap material adjusted for a tight fit on the earpiece of a pair of eyeglasses;

FIG. 8 illustrates the modified end adjusted to provide a medium size loop in the strap material;

FIG. 9 illustrates the modified end adjusted for a relatively small loop in the strap material; and FIG. 10 illustrates the modified end with a spring ring attached.

DETAILED DESCRIPTION

Referring now to the drawings, wherein like reference characters designate like or corresponding parts throughout several views, FIGS. 1-3 illustrate an item of jewelry 10 constructed in accordance with the teachings of the present invention. As will be explained hereinafter, item 10 may be used as a necklace for wear about the neck or used as a strap to retain a pair of eyeglasses about the neck.

The item 10 includes three major components, the necklace section 12 and ends 14 and 16. The necklace section includes an elongate flexible strand 18. In the preferred construction, the strand 18 will be formed of aesthetically pleasing material such as commonly used in the jewelry trade. For example, the strand 18 may be formed of 14 karat gold assembled in a chainlike structure.

At a first end of the strand 18 is a solid ring 20. At the opposite end of the strand is a spring ring 22. The spring ring 22 includes arcuate gap 24 sized to permit passage of the solid ring 20. The gap is typically closed by an arcuate internal pin 26 urged across the gap by a spring (not shown). The pin 26 may be retracted with a nail, for example, through the extension 28 of the pin. The necklace section 12 may be positioned about the neck of the wearer as shown in FIG. 2 and the solid ring 20 interlocked through the gap 24 with the spring ring 22 to form a necklace.

Should the wearer desire to retain a pair of eyeglasses about the neck, the ends 14 and 16 are secured at either end of the necklace section 12 to form a strap for holding the pair of eyeglasses. A first construction of the ends 14 and 16 is illustrated in FIG. 4. The ends are substantially identical and the description of one is fully applicable to the other. The end 14 illustrated in FIG. 4 includes a bell shaped body 30 forming a hollow cylindrical shape with one open end. The opposite end of the body forms a closure having an aperture 32 therethrough. The body 30 is constructed with an exterior shape and of materials to provide a pleasing appearance. A length of resilient strap material 34 is looped in its midsection with the free ends thereof extending through the aperture 32. The free ends are crimped within the body 30 by a crimp 36.

A rigid ball 38 is provided with a through hole for accepting a wire 40. One end of the wire 40 forms a hook 42 positioned about crimp 36 with its end crimped therein. The opposite end of the wire 40 includes a hook 44 for connecting to a spring ring 46. The ball is press fit within the body 30, aided by the bell shaped open end.

In use, the spring ring 46 of end 14 is interlocked with the solid ring 20 of the necklace section 12. In the preferred construction, the end 16 does not have the spring ring 46 of end 14. The hook 44 of end 16 is interlocked with the spring ring 22 of the necklace section 12. The resilient straps 34 may then be pressed over the earpieces 48 and 50 of a pair of eyeglasses 52 as shown in FIG. 3.

An alternate and preferred construction of the ends 14 and 16 is illustrated in FIG. 5. In this construction, the resilient strap 34 is substituted for by an O-ring 54. The O-ring, for example, may comprise rubber or polyurethane. A portion of the O-ring is inserted through the aperture 32. The hook 42 loops about the portion of the O-ring within the body 30. The O-ring 54 will provide a longer service life than the resilient strap 34 and, in addition, be readily replaceable by the wearer. The life of the item 10 for use as a necklace is indefinite. Therefore, it is preferred to permit periodic repair of the ends to retain the strap function of the item.

As can be seen, the item 10 permits two often used and significant functions to be performed by the one piece of jewelry. When desired, the item 10 may be used as a necklace for purely decorative purposes. When wearing glasses, the item may be formed into an eyeglass strap performing the usable function of retaining the eyeglasses within easy reach while being attractive and fashionable.

In addition, ends 14 and 16 may be used with any necklace having a clasp structure which is compatible with the ends so that the necklace may also function as an eyeglass strap.

A modified end 60 is illustrated in FIGS. 6-10. The end 60 is similar in appearance to ends 14 and 16 described hereinabove. The end 60 includes a length of resilient strap material 62 for looping over the earpieces of a pair of eyeglasses 64.

As can best be seen in FIG. 6b, the end 60 includes a bell shaped body 66 forming a hollow cylindrical shape with one open end 68. The opposite end of the body forms a closure having an aperture 70 therethrough. The resilient strap material 62 is looped at one end and inserted through end 68. A wire 72 forms a hook 74 at one end to attach the wire 72 to the resilient material 62 within body 66. The opposite end of the wire 72 extends outside the bell shaped body 66 through aperture 70 and forms a hook 76. A bead 78 is secured by the hook 76 to provide a finger grip. The hook 76 is also adapted to secure a spring ring 22 thereto for attachment to the necklace 18 as shown in FIG. 10 or a solid ring if desired.

With reference to FIGS. 6-10, it will be apparent that the wearer can adjust the size of the loop 80 formed by the strap material 62 extending out of the end 68. A decrease in the size of loop 80 is accomplished by grasping the bead 78 and pulling the bead away from the bell shaped body 66. This draws a portion of wire 72 out of the body 66 and necessarily draws a portion of strap material 62 into the body 66 to decrease the size of loop 80. The wearer can increase the size of loop 80 by pulling the strap material 62 outside the body 66 away from the body 66 to enlarge the size of loop 80 and move the wire 72 into the body.

This adjustment feature permits the wearer to adjust the size of loop 80 to tighten the loop about the earpiece of the eyeglasses 64 as seen in FIG. 7 by pulling bead 78. This will prevent the end 60 from inadvertently sliding off the earpiece. The resiliency of strap material 62 is sufficient so that the compression of the strap material through the end 68 will retain the loop size constant under service conditions. The strap material can form a large loop 80 as seen in FIGS. 6(a) and 6(b), a small loop 80 as seen in FIGS. 9 and 10, or any intermediate size loop 80, as seen in FIG. 8. When the end 60 is to be removed from the earpiece, the loop 80 can be enlarged by pulling the body 66 away from the earpiece to pull strap material 62 through the end 68 so that the end can slip off the earpiece. In the preferred embodiment, strap material 62 is formed of an O-ring identical to O-ring 54. However, strap material 62 can be formed identical to strap 34 shown in FIGS. 4(a)-(c) with hook 74 secured to crimp 36.

It will be appreciated from FIGS. 4, 5, 6 and 9 that wire 40 and wire 72 cannot be withdrawn from ball 38 or through aperture 70, respectively, once assembly is completed. As shown in FIGS. 4 and 5, wire 40 is passed through the opening in ball 38 and is secured therein by hooks 42 and 44 formed at the ends of wire 40. Hook 42 connects wire 40 to resilient strap material 34 or to C-ring 54. Hook 44 may be connected with spring ring 46 for interconnecting with a necklace section 12.

As shown in FIGS. 6 and 9, wire 72 is formed with end hooks 74 and 76 which are diametrically larger than aperture 70. Hook 74 interconnects with resilient strap material 62 within bell-shaped body 66. Hook 76 is external to body 66 and may conveniently include bead 78 for grasping to move wire 72 within aperture 70.

Thus, resilient straps 34 (FIG. 4), 54 (FIG. 5) and 62 (FIGS. 6 and 9) cooperate with respective wires 40 and 72 to maintain extending loops. As exemplified by FIGS. 6-10, and as hereinbefore discussed, the size of loop 80 may be increased or decreased by moving wire 72 through aperture 70 and within body 66. External loop 80 remains outside body 66 through the range of movement for wire 72 permitted by hooks 74 and 76.

Although only a single embodiment of the invention has been illustrated in the accompanying drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. An end for use in securing a flexible strand having strand fastening means to the earpiece of a pair of eyeglasses, said end comprising:
   - a body forming a generally cylindrical shape open at one end and having a closure at the opposite end with an aperture therethrough;
   - a resilient strap material extending through said opening to define a loop exterior of said body through which the earpiece of said eyeglasses can be inserted, the compression of said resilient strap material at the opening resisting motion of said resilient strap material through the opening; and
   - a rigid member having a first hook secured to the resilient strap material within said body, said rigid member movably extending through the aperture in said body and having a second hook exterior of said body for attachment to said strand fastening means on said flexible strand, said rigid member being cooperatively movable out of the body to draw the resilient strap material into the body to decrease the size of said exterior loop, said rigid member being movable into the body and said resilient strap material being movable out of the body to enlarge said exterior loop, the variation in loop size being limited by said first and second hooks while permitting the exterior loop to be positioned encircling the earpiece and thereafter tightening about the earpiece to resist motion relative thereto.

2. An end member according to claim 1 wherein said resilient strap is an O-ring.

3. An end member according to claim 2, wherein said closure for said cylindrical shape includes a spherical member press fitted within said cylindrical shape.

4. An end member according to claim 1 wherein said extending portion of said rigid member includes a finger grip member.

5. An item of jewelry comprising:
   - a flexible strand having first strand fastening means at one end thereof and second strand fastening means at the opposite end thereof, said first and second strand fastening means being adapted for mutual engagement to form a necklace;
   - first and second gripping means for securing said strand ends on the earpiece of a pair of eyeglasses, each of said gripping means further having first and second end fastening means, respectively, thereon adapted for a mutual engagement with said first and second strand fastening means, respectively, to form an eyeglass strap to secure a pair of eyeglasses about the neck of a wearer;
   - each of said gripping means further comprising a body forming a generally cylindrical shape open at one end and having a closure at the opposite end with an aperture therethrough;
   - a resilient strap material forming a loop extending through said opening in said body, the compression of the resilient strap material at said opening resisting motion of the strap therethrough; and
   - a rigid member having a first hook secured to said resilient strap and securing a portion of said resilient strap material within said body, said rigid member movably extending through the aperture in said body and defining an extending second hook, for securing said end fastening means thereto;
   - said first hook limiting withdrawal of said resilient strap material within said body to define a minimum loop size and said second hook limiting withdrawal of said resilient strap material from said body to define a maximum loop size.

6. The item of jewelry of claim 5 wherein said resilient strap is an O-ring.

7. An item of jewerly according to claim 6, wherein said closure for said cylindrical shape includes a spherical member press fitted within said cylindrical shape.

8. An item of jewelry according to claim 5, wherein said extending second hook includes a finger grip.

9. An item of jewelry according to claim 8, wherein said finger grip includes means for cooperatively engaging said strand fastening means.

* * * * *